United States Patent
Darius et al.

(10) Patent No.: US 7,930,241 B1
(45) Date of Patent: Apr. 19, 2011

(54) MORTGAGE INFORMATION EXCHANGE PLATFORM FOR A BROKER TO SELECT A MORTGAGE LENDER

(75) Inventors: Ivan Henri Robert Darius, Richardson, TX (US); Dries Jos Rachel Darius, Richardson, TX (US); Lawrence Oliver Huff, Southlake, TX (US); Benny Sylvere Verneersch, Plano, TX (US)

(73) Assignee: Sollen Technologies LLC, Dallas, TX (US)

( * ) Notice: Subject to any disclaimer, the term of this patent is extended or adjusted under 35 U.S.C. 154(b) by 748 days.

(21) Appl. No.: 09/593,786

(22) Filed: Jun. 14, 2000

Related U.S. Application Data (60) Provisional application No. 60/139,148, filed on Jun. 14, 1999.

(51) Int. Cl.
G06Q 40/00 (2006.01)
(52) U.S. Cl. .......................................................... 705/38
(58) Field of Classification Search .............. 705/35–38, 705/1, 1.1
See application file for complete search history.

(56) References Cited

U.S. PATENT DOCUMENTS

| | | | | |
|---|---|---|---|---|
| 5,148,365 A * | 9/1992 | Dembo | ....................... | 705/36 R |
| 5,699,527 A * | 12/1997 | Davidson | ....................... | 705/38 |
| 5,742,775 A * | 4/1998 | King | ....................... | 705/38 |
| 5,758,331 A * | 5/1998 | Johnson | ....................... | 705/412 |
| 5,940,812 A * | 8/1999 | Tengel et al. | ....................... | 705/38 |
| 5,995,947 A * | 11/1999 | Fraser et al. | ....................... | 705/38 |
| 6,014,645 A * | 1/2000 | Cunningham | ....................... | 705/38 |
| 6,169,979 B1 * | 1/2001 | Johnson | ....................... | 705/412 |
| 6,233,566 B1 * | 5/2001 | Levine et al. | ....................... | 705/36 R |
| 6,385,594 B1 * | 5/2002 | Lebda et al. | ....................... | 705/38 |
| 6,438,526 B1 * | 8/2002 | Dykes et al. | ....................... | 705/38 |
| 6,920,434 B1 * | 7/2005 | Cossette | ....................... | 705/38 |
| 2002/0029188 A1 * | 3/2002 | Schmid | ....................... | 705/38 |
| 2003/0018558 A1 * | 1/2003 | Heffner et al. | ....................... | 705/37 |
| 2003/0055778 A1 * | 3/2003 | Erlanger | ....................... | 705/38 |
| 2004/0002915 A1 * | 1/2004 | McDonald et al. | ....................... | 705/38 |
| 2004/0019558 A1 * | 1/2004 | McDonald et al. | ....................... | 705/38 |

OTHER PUBLICATIONS

Frank J. Fabozzi, Chuck Ramsey, Frank R. Ramirez; Collateralized Mortgage Obligations: Structures and Analysis; Second Edition; 1994; pp. 14 and 15.*
Business Wire; "Utah Based Online Wholesale Lender Network Announces Exclusive Agreement to Provide Lender Network"; Feb. 16, 1999; pp. 1 and 2.*
Bowen, Laura; "Desktop originator helps small lenders compete"; Real Estate Finance Today; V. 15, n 18; Sep. 7, 1998; pp. 1 and 2.*

(Continued)

*Primary Examiner* — Ella Colbert
(74) *Attorney, Agent, or Firm* — Slater & Matsil, L.L.P.

(57) ABSTRACT

A mortgage information exchange platform implemented in software executable on a web server facilitates information exchange between online brokers and mortgage lenders. Using a web browser, brokers can search their lenders' products and pricing online to find the best loan options for customers. Initially, a rating engine in the platform exposes to the broker a set of one or more generic mortgage lender profiles. In response to entry by the broker of given data from a prospective customer, a given generic mortgage lender profile is applied to the data to identify a set of one or more specific wholesale lenders who meet criteria specified in the given data. The broker then makes a selection of one of the candidate wholesale lenders listed. In response, the rating engine is instantiated with a set of unique lender characteristics for use by the broker in completing an online mortgage transaction.

6 Claims, 8 Drawing Sheets

OTHER PUBLICATIONS

PR Newswire; PMI Picked by IMX Mortgage Exchange to Provide pmi AURA (SM) Scores, Contract Underwriting Services; Oct. 2, 1997; pp. 1 and 2.*

"On-Line Mortgage Trading System Debuts"; Oct. 1, 1997; pp. 1-3.*

Muolo, Paul; Farewell, Big Pond-Hello, Startup; US Bank, V108,n5; May 1998; pp. 1-4.*

Credit Risk Management Report; MarketPlace Profile: Network Vendor; Jul. 27, 1998; NAGE, vol. 8, Issue 14; pp. 1 and 2.*

* cited by examiner

Mortgage Broker's Assistant by Sollen Technologies LLC

File  Config  Action  Help

InterFirst
777 E. Eisenhower Parkway
Suite 700
Ann Harbor [MI]

Phone XXX-XXX-XXXX
Fax XXX-XXX-XXXX

30 Year Fixed

| RATES | 15 Days | 30 Days | 45 Days | 60 Days |
|-------|---------|---------|---------|---------|
| 6.000 | 3.250 | 3.375 | 3.500 | 3.625 |
| 6.125 | 2.875 | 3.000 | 3.125 | 3.250 |
| 6.250 | 2.125 | 2.250 | 2.375 | 2.500 |
| 6.375 | 1.375 | 1.500 | 1.625 | 1.750 |
| 6.500 | 0.500 | 0.625 | 0.750 | 0.875 |
| 6.625 | 0.000 | 0.125 | 0.250 | 0.375 |
| 6.750 | -0.500 | -0.375 | -0.250 | -0.125 |
| 6.875 | -1.125 | -1.000 | -0.875 | -0.750 |
| 7.000 | -1.500 | -1.375 | -1.250 | -1.125 |
| 7.125 | -2.000 | -1.875 | -1.750 | -1.625 |
| 7.250 | -2.375 | -2.250 | -2.125 | -2.000 |

Monthly Payment (P & I)
Monthly Payment (M & I)

Fees

Broker

Adjustment  -0.625

EXIT

| | |
|---|---|
| Unadjusted YSP | -0.750 |
| Broker Discount | -0.125 |
| Program Discount | -0.125 |
| IF [(Loan Purpose is Purchase)] | -0.250 |
| IF [[(Property is Single Family) OR (Property is Condo) OR (Property is PUD)] AND [(Occupancy is Primary (OD))]] | -0.125 |
| Cumulative YSP | -1.375 |

Click on desired rate to change

```
Mortgage Broker's Assistant by Sollen Technologies LLC - [MBA - Lock In Sheet]
File  Config  Action  Help
```

Property Address 440 Edge Lake Drive                    Property City Dallas
County _____________ State TX                            Zip Code _______

LOAN INFORMATION

InterFirst Program No. 100                               Loan Amount $ ______    Lock Term ______
Interest Rate 7.125%                                     Rate Sheet No. ______   Sales Price or
(First Down Option Program 100, 101, or 120 only)                                Appraised Value $110,000
Construction EZ MI Permanent Utilizing the One Time Close    Yes ___ No ___
    Rate Before Add-On  [____]                               Yes ___ No ___
    Rate After Add-On   [____]                               Yes ___ No ___ to Secondary Marketing

*NOTE: The applicable rate down fee is due no later than 72 hours to Secondary Marketing
Please Circle One of the following for each category:
Property Type:              Purchase:                    Occupancy:          Number of Units
1. Single Family Detached   1. Purchase                  1. Primary          1. One
2. Condominium              2. Rate/Term Refinance       2. Non-Owner        2. Two
3. Townhouse                3. Equity Out Refinance      3. Second Home
4. PUD                      4. Construction Permanent
                            5. One Time Close If Property Type is Condominium, Condominium Name: _______________________

TOTAL PRICE CALCULATION

Rate Sheet Base Price Adjustment
Loan > $1000,000 (+.25)
    (Programs 100, 101, 120 only)
Non-Owner Occupied (-1.50)
    (Programs 100, 101, 120 only)
Buydown (Refer to rate sheet by program)

Second Home (-.25: Refer to rate sheet by program)
    (ARMs only)

*InterFirst*

FIG. 8

Mortgage Broker's Assistant by Sollen Technologies LLC – [Form 2]

File  Config  Action  Help

*Sollen Technologies*                                                           Personalized Rate Sheet® 5/27/99 11:38:45 AM

| Conforming 20 Yr Fixed | | Conforming 30 yr Fixed, CHB, ___, Gold, Flex, etc. | | Conforming 15 Yr Fixed | |
|---|---|---|---|---|---|
| 7.800 | Crosland Mortgage Co. | 7.500 | Crosland Mortgage Co. | −2.200 | 7.900 | HomeSide Lending | −3.100 |
| 7.750 | Crosland Mortgage Co. | 7.300 | Interfirst | −1.800 | 7.800 | HomeSide Lending | −3.050 |
| 7.000 | Crosland Mortgage Co. | 7.000 | Interfirst | −1.800 | 7.700 | HomeSide Lending | −3.025 |
| 7.000 | Interfirst | −3.300 | 6.900 | Interfirst | −1.300 | 7.650 | HomeSide Lending | −3.020 |
| 7.000 | Interfirst | −3.300 | 6.800 | Interfirst | −1.200 | 7.500 | First Nationwide Mortgage | −2.900 |
| 7.000 | Interfirst | −3.200 | 6.750 | Interfirst | −0.950 | 7.300 | Interfirst | −2.800 |
| 6.900 | Interfirst | −3.200 | | | | 7.200 | Crestar Mortgage Corp. | −2.600 |
| 6.900 | Interfirst | −0.800 | | | | 7.000 | First Nationwide Mortgage | −2.350 |
| 6.800 | Interfirst | −0.700 | | | | 6.950 | First Nationwide Mortgage | −2.250 |
| 6.700 | Interfirst | −0.700 | | | | 6.500 | Interfirst | −2.100 |
| 6.600 | Interfirst | −0.600 | | | | 6.500 | Interfirst | −2.100 |
| 6.500 | Interfirst | −0.600 | | | | 6.450 | Interfirst | −2.000 |
| 6.400 | Interfirst | −0.600 | | | | 6.300 | Interfirst | −1.950 |
| 6.300 | Interfirst | −0.600 | | | | 6.200 | Interfirst | −1.900 |

| Conforming 15 yr Fixed, CHB, ___, Gold, Flex, etc. | | Conforming 1 Yr ARM | | Conforming 5 Yr Balloon | |
|---|---|---|---|---|---|
| 6.300 | Interfirst | −0.600 | 6.800 | Countrywide | −1.400 | 7.300 | Countrywide | −1.200 |
| 6.300 | Interfirst | −0.600 | 6.700 | Crosland Mortgage Co. | −1.300 | 7.300 | Countrywide | −1.200 |
| 6.300 | Interfirst | −0.600 | 6.650 | First Nationwide Mortgage | −1.250 | 7.300 | Premier Bank | −1.150 |
| 6.300 | Interfirst | −0.600 | 6.650 | First Nationwide Mortgage | −1.250 | 7.300 | Interfirst | −1.125 |
| 6.300 | Interfirst | −0.600 | 6.650 | First Nationwide Mortgage | −1.150 | 7.300 | Crestar Mortgage Co. | −1.120 |
| 6.300 | Interfirst | −0.600 | 6.500 | First Nationwide Mortgage | −1.125 | 7.250 | Interfirst | −1.100 |
| 6.300 | Interfirst | −0.600 | 6.500 | First Nationwide Mortgage | −1.100 | 7.100 | Crestar Mortgage Co. | −1.100 |
| 6.300 | Interfirst | −0.600 | 6.400 | First Union Mortgage | −1.000 | 7.100 | Crestar Mortgage Co. | −1.050 |
| 6.300 | Interfirst | −0.600 | 6.400 | First Union Mortgage | −1.000 | 7.100 | Crestar Mortgage Co. | −1.000 |
| 6.300 | Interfirst | −0.600 | 6.350 | First Union Mortgage | −1.000 | 7.000 | Crestar Mortgage Co. | −1.000 |
| 6.300 | Interfirst | −0.600 | 6.325 | First Union Mortgage | −1.000 | | | |
| 6.300 | Interfirst | −0.600 | 6.300 | First Union Mortgage | −1.000 | | | |

MORTGAGE INFORMATION EXCHANGE PLATFORM FOR A BROKER TO SELECT A MORTGAGE LENDER

This application is based on and claims priority from Provisional Application Ser. No. 60/139,148, filed Jun. 14, 1999.

TECHNICAL FIELD

The present invention relates generally to techniques for web-based information exchange between a broker and a set of wholesale mortgage lenders over a computer network such as the Internet.

DESCRIPTION OF THE-RELATED ART

The World Wide Web is the Internet's multimedia information retrieval system. In the Web environment, client machines effect transactions to Web servers using the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator) at a client machine involves specification of a link via the URL. In response, the client makes a request to the server identified in the link and, in return, receives a document or other object formatted according to HTML. A collection of documents supported on a Web server is sometimes referred to as a Web site. One of the technical advantages of the World Wide Web is the ease with which information may be posted and retrieved by users. Any computer user may navigate to a web site of interest and obtain relevant information hosted by the site.

It is estimated that the mortgage industry is a 1.25 trillion-dollar a year industry. A community of 50,000 brokers in the United States generates 50% of this business. There are approximately 300 wholesale lenders providing 95% of the capital and products that the brokers represent to the retail borrower. The advantage to the lender of using the broker channel is that the lender does not have to invest in retail storefronts and broad-based marketing efforts while retaining the servicing revenue for the life of the loan. Brokers, likewise, need easy access to the lender's products and the supply of capital to fund the mortgage(s).

The broker community functions independently of the wholesale lenders. The brokers can offer the mortgage product(s) of any wholesale lender they choose as long as they are approved by the wholesale lender and meet specific state and federal licensing requirements.

Figure 1:
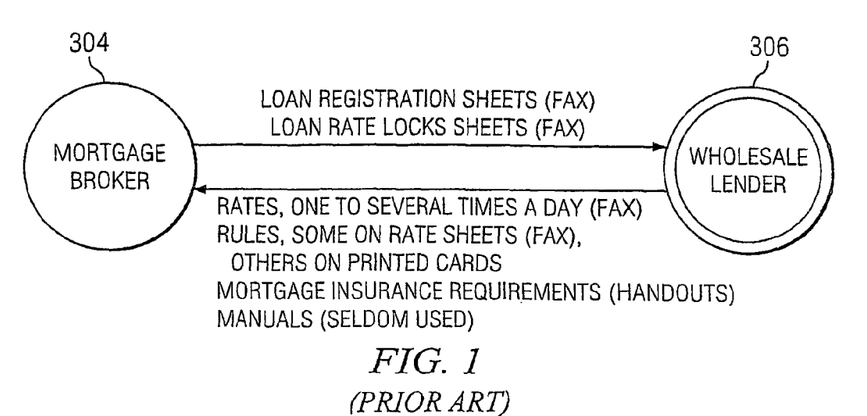
FIG. 1 is a simplified illustration of the current paradigm for information exchange between a mortgage broker and a wholesale lender.

Product pricing for mortgages is dynamic; interest rates and incentives are tied to the bond market and cause interest rates to fluctuate throughout the day. The current method used by the wholesale lenders to provide products and pricing information to the broker is via a "rate sheet" faxed one or more times per day. This method creates the situation where brokers may receive as many as 750 fax pages a day. The sheer volume of faxes and induced information overflow coupled to the inefficient delivery of this information creates a tremendous cost and burden to both the broker and the wholesale lender. FIG. 1 illustrates the current information exchange paradigm between the mortgage broker 304 and the wholesale lender 306.

There are software packages available on the market today to assist the broker in the generation of the paperwork necessary to initiate and complete the mortgage process. These packages are usually called "loan processing software" and they are used by a very large percentage of mortgage brokers. The software typically stores essential information about the borrower and generates the standard documents that need to be sent to the wholesalers and lender agencies such as FannieMae or FreddieMac. While these software programs provide some advantages, there remains a need in the art to provide improved methods for enabling mortgage brokers and lenders to exchange information. The present invention addresses this need.

BRIEF SUMMARY OF THE INVENTION

A mortgage information exchange platform is implemented in software executable on a web server to facilitate information exchange between online brokers and mortgage lenders. Using a web browser, brokers can search their lenders' products and pricing online to find the best loan options for customers. Initially, a rating engine in the platform exposes to the broker a set of one or more generic mortgage lender profiles. In response to entry by the broker of given data from a prospective customer, a given generic mortgage lender profile is applied to the data to identify a set of one or more specific wholesale lenders who meet criteria specified in the given data. The broker then makes a selection of one of the candidate wholesale lenders listed. In response, the rating engine is instantiated with a set of unique lender characteristics for use by the broker in completing an online mortgage transaction. The foregoing has, outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 8 illustrates the display of a rate sheet summary;

DETAILED DESCRIPTION OF THE PREFERRED EMBODIMENT

Figure 2:
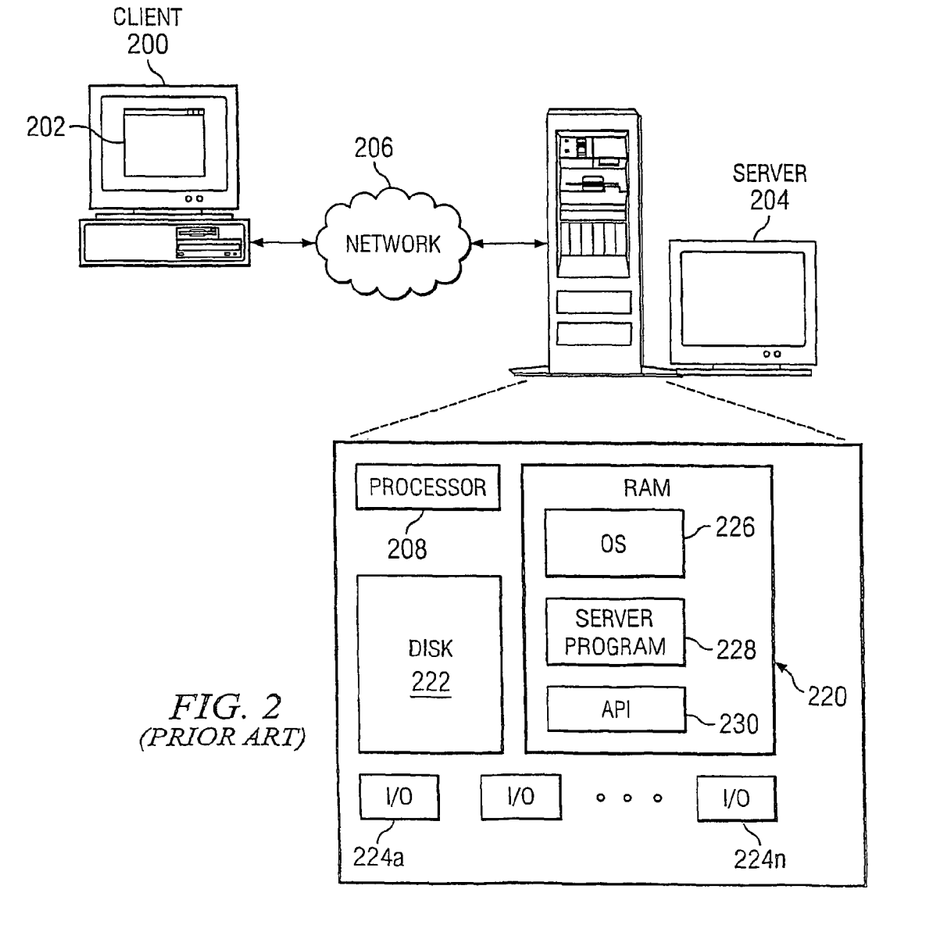
FIG. 2 is a simplified illustration of a known client-server computing environment in which the present invention may be implemented.

The present invention is a mortgage information exchange platform operative in a computer network such as the public Internet, an intranet, a virtual private network, a combination thereof, or the like. As is well-known, in the Internet paradigm as illustrated in FIG. 2, a client machine, such as machine 200, may use an application, such as a web browser 202, to access a server 204 via a computer network 206. Network 206 typically includes other servers (not shown) for control of domain name resolution, routing and other control functions. A representative server 204 is a computer or workstation having at least one processor 208, system memory (e.g., RAM) 220, disk or other permanent storage 222, I/O devices 224*a-n*, an operating system 226, a server program 228, and an application programming interface (API) 230 that provides extensions to enable application developers to extend and/or customize the core functionality thereof through software programs including plug-ins, CGI programs, Java servlets, and the like.

A representative server machine is an Intel Pentium® or RISC-based processor platform running an operating system (e.g., Unix, Linux, Windows, Apache, or the like) and a server program such as IBM® WebSphere® Version 2.0. Of course, any other computer hardware, operating system and/or server software may be used.

A representative client is a personal computer, notebook computer, Internet appliance or pervasive computing device (e.g., a PDA or palm computer) that is Pentium-, PowerPC®—or RISC-based. The client includes an operating system such as Microsoft Windows, Linux, Microsoft Windows CE, PalmOS or the like. A typical client includes a suite of Internet tools including a Web browser, such as Netscape Navigator or Microsoft Internet Explorer, that has a Java Virtual Machine (JVM) and support for application plug-ins or helper applications. Communications between the client and the server typically conform to the Hypertext Transfer Protocol (Version 1.0 or higher), and such communications may be made over a secure connection.

Figure 10:
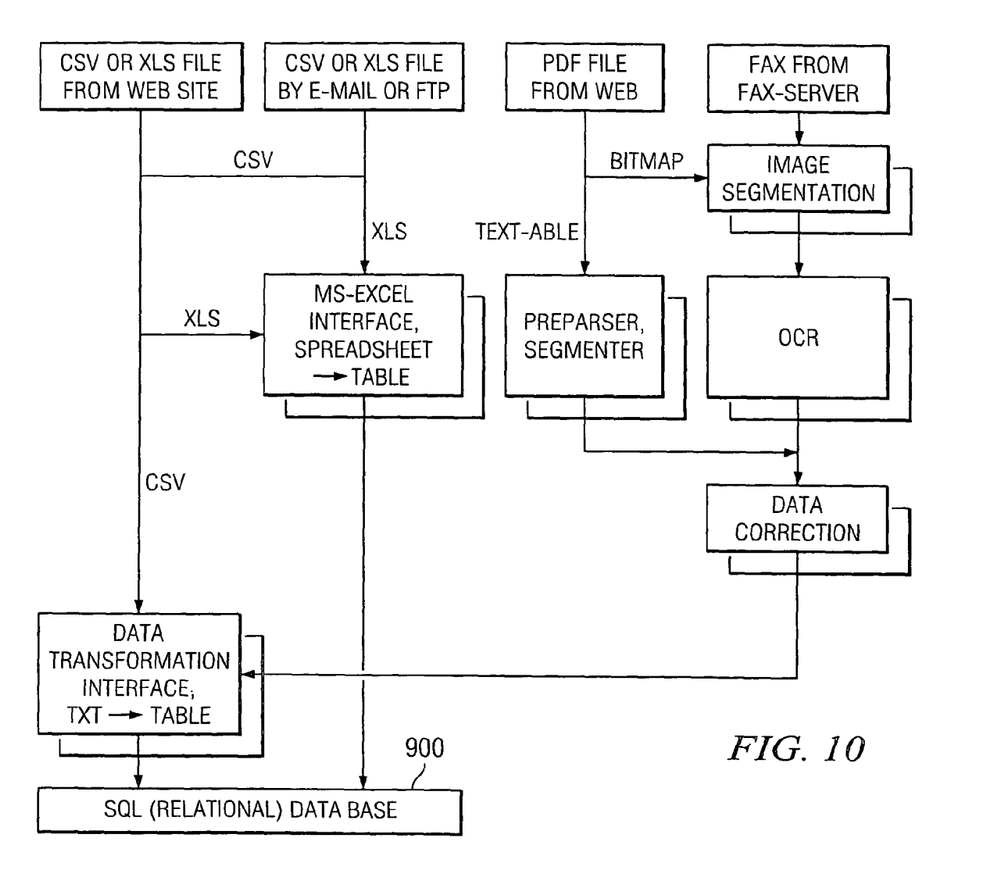
FIG. 10 illustrates how rate sheets are processed in the information exchange platform.

According to the present invention, the mortgage information exchange platform is supported on one or more servers, and brokers interact with the platform via client machines. FIG. 10 is one illustrative network implementation, although this configuration should not be taken to limit the present invention.

Figure 3:
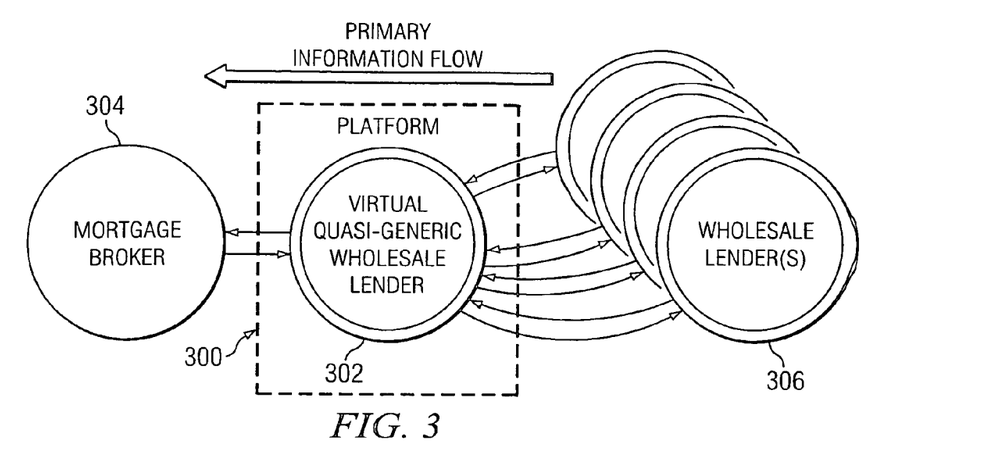
FIG. 3 is a simplified illustration of the mortgage information exchange platform of the present invention wherein a virtual generic wholesale lender (VGWL) object is used to manage initial information flow to the requesting broker.

The mortgage information exchange platform 300 as illustrated in FIG. 3 includes a virtual generic wholesale lender (VGWL) object 302 which serves to interface one or more mortgage brokers 304 to a set of wholesale lenders 306 while only a single mortgage broker is illustrated in FIG. 3, embodiments of the invention may include more than one mortgage broker. A mortgage broker 304 operates a client machine having a browser. According to the invention, the VGWL object 302 provides a level of abstraction between the wholesale lenders' information and the inquiring broker. The VGWL object executes a pricing engine that exposes to the broker a set of one or more generic mortgage lender profiles from which the broker may select. A generic mortgage lender profile, for example, may include the basic details associated with a 30 year fixed mortgage program, a 15 year fixed mortgage program, a 7.5 year balloon mortgage program, or the like. Using a forms-based web page, the broker fills out information about a prospective mortgage that is received from the broker's customer. The generic mortgage lender profile is executed against that data (as a filter) to identify a set of one or more specific wholesale lenders who meet criteria specified in the entered data. The broker may then select a specific mortgage lender from the list. When the broker makes a selection, the VGWL is instantiated with appropriate data to display lender-specific implementation details.

Thus, according to the invention, the VGWL effectively restricts the information flow to the broker to the essential aspects of the mortgage program and then provides the necessary automation to deal with the details of some of the elements after the broker has selected a specific candidate lender. In this framework, the broker deals with a virtual generic wholesale lender at least until the preliminary selection is made. In particular, the VGWL provides a level of abstraction to allow the broker to more easily make preliminary decisions such as the type of loan (fixed vs. adjustable rate, rate, loan-to-value etc.). Generalizing, the VGWL is a generic representation, in the broker's jargon, of a lender. By providing generic mortgage lender profiles in this manner, the framework represents most (quasi complete) usable (and used) options with the lender specific elements right below the representational surface.

Figure 4:
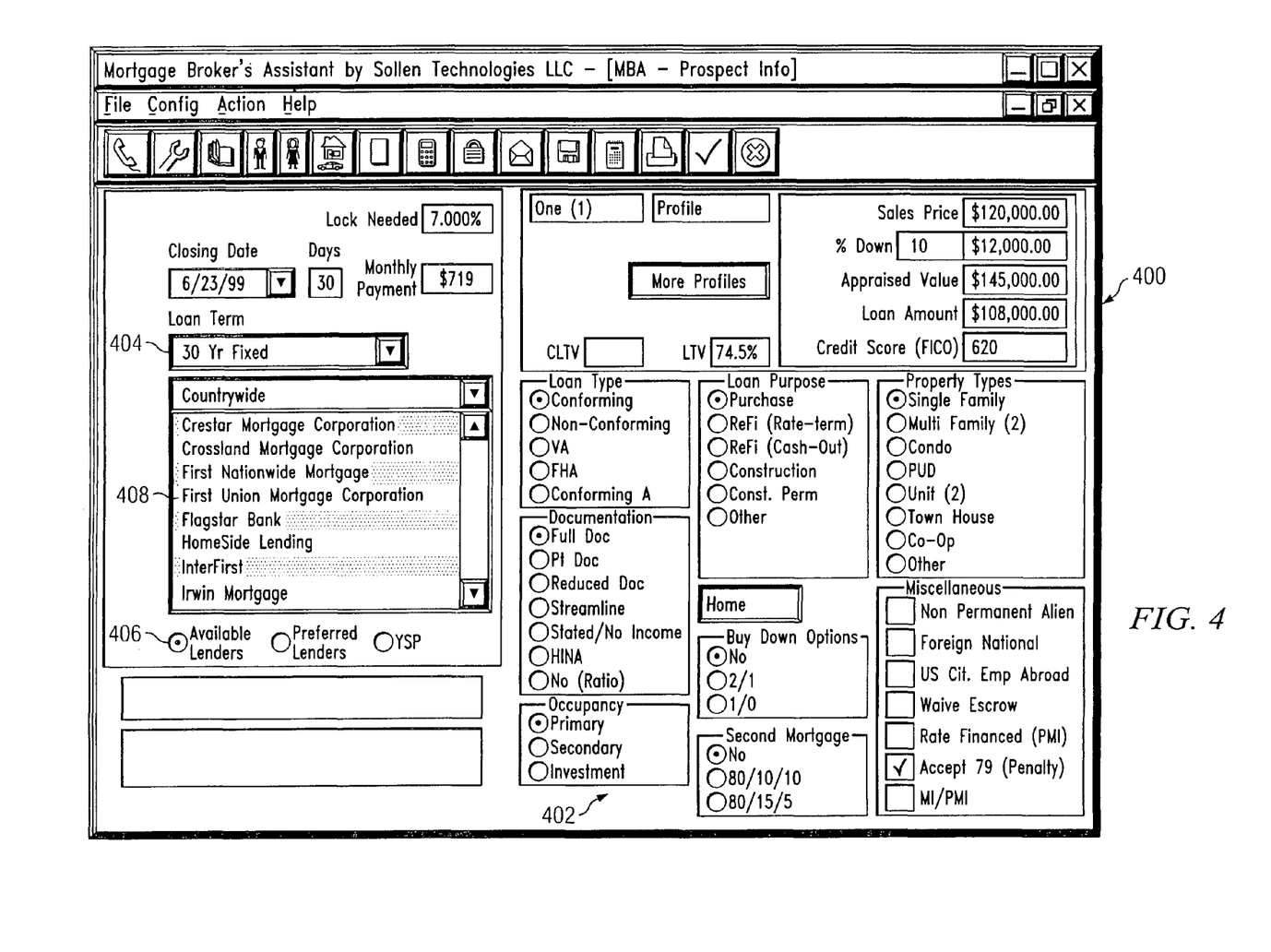
FIG. 4 is a browser-based screen display (namely, a web page) that is exposed to the broker by the VGWL object prior to the broker's selection of a given wholesale mortgage lender.

This representational framework allows the VGWL-engine to maintain and display a list of real wholesale lenders that meet the criteria as specified. FIG. 4 illustrates a representative web page 400 that illustrates this functionality. In this example, the web page includes a fill-in form 402 that includes fields that are filled-in by the broker. These fields include sales price, percentage down payment, appraised value, loan amount, credit score, loan type, documentation, occupancy, loan purpose, property type, buydown options, second mortgage data, and other such information. This data is collected by the broker from the prospective buyer (i.e., the broker's customer). The web page also includes a pull-down menu box 404 that identifies the generic mortgage lender profile (e.g., 30 Yr. Fixed, 15 Yr. Fixed, 7.5 Yr. Fixed, etc.). By selecting the radio button 406 (Available Lenders), the VGWL-engine populates the listbox 408 with a set of specific wholesale lenders who may have mortgage programs that meet the customer's requirements as set forth in the fill-in form.

The above-described functionality eliminates the need for the broker to remember in detail that a particular lender does or does not support a specific program under the chosen conditions. Once the broker decides to deal with a certain lender for a given prospect, the VGWL-engine presents the unique lender characteristics. These represent the information normally distributed to brokers such as rate sheets, brochures, eligibility matrices, lock and registration sheets, etc.

Thus, as seen in FIG. 4, the listbox 408 includes the list of lenders pre-selected by the broker that provide programs that meet the conditions and selections reflected in the on-screen variables. The on-screen variables are shown on the fill-in form 402 and reflect the answers to the standard questions brokers will ask their customers. When the options are changed (say from property=Single Family to property=Town House) then the lenders that have rules eliminating this option will disappear from the listbox 408.

Figure 5:
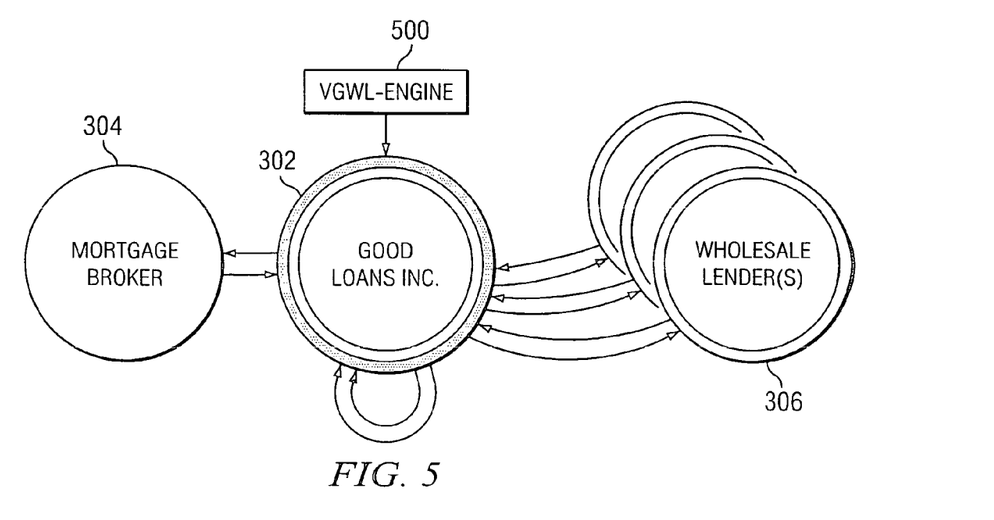
FIG. 5 is a simplified illustration of the mortgage information exchange platform after the broker has selected a wholesale mortgage lender and the VGWL has been instantiated to expose the selected lender's characteristics to the broker.

When the broker selects from the list, he or she is assured that the lender picked will support the program chosen. The VGWL-engine now takes on the personality of the selected lender. This functionality is illustrated in FIG. 5. In FIG. 5, element 302 is a specific instantiation of the virtual generic wholesale lender object of FIG. 3; element 304 represents a mortgage broker, and element 306 represents a wholesale lender. In this example, the VGWL-engine 500 now acts as if it were only presenting the Good Loans Inc. programs and rates to the broker. In an illustrative embodiment, the on-screen conditions may be used, for example, to adjust Yield Spread Points (YSPs) displayed on a rate sheet. As is well-known, Yield Spread Points (YSPs) are the incentive paid to a broker when the borrower (client) buys the loan from the broker-recommended lender. These points are expressed as a percentage of the loan value. These YSPs are what the wholesale lender will send to its customers in a collection usually called a rate sheet. The YSPs are ordered by loan program (Conforming 30 Year Fixed loan) and by rates (interest rates to be paid by the borrower). In general, the YSPs are set by the lender to favor certain programs over others with an underlying trend that higher interest rates earn more YSP (loan is worth more to the lender). Adjustments to these points are posted somewhere on the rate sheet.

Figure 6:
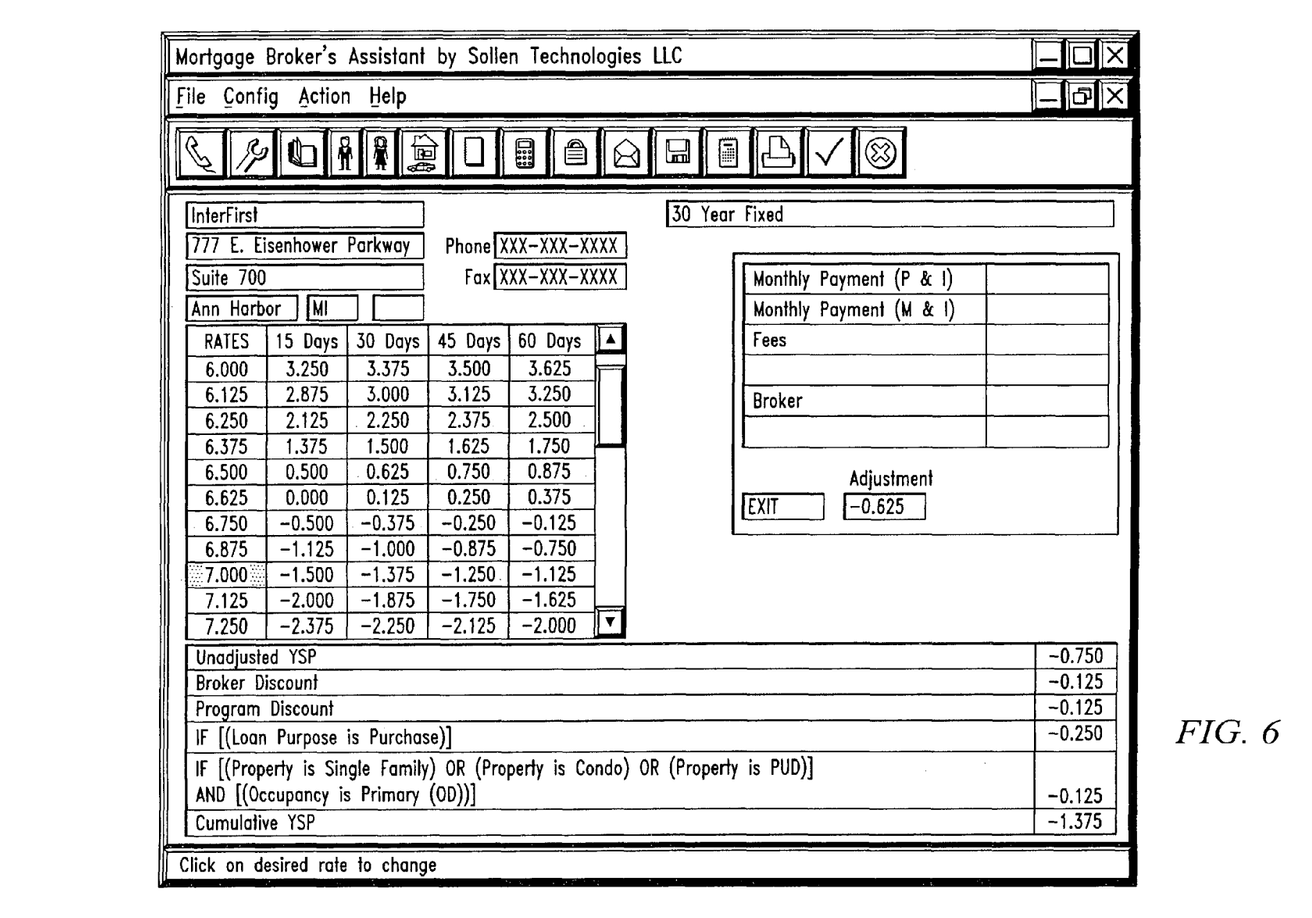
FIG. 6 is a browser-based screen display (a web page) exposed to the broker following the broker's selection of the particular wholesale lender.

When the (temporary) lender selection is made, as described above, the VGWL-engine displays (again, preferably as a web page) a rate sheet element (table) relevant to the program chosen. This is illustrated in FIG. 6. The screen shown combines all of the elements needed to evaluate the lender-loan program combination for the particular borrower situation. When the decision is made about the rate-lender-loan program trio, the system produces the necessary documents, specific to the wholesale lender, to complete the transaction, based on the information provided by the borrower (through the broker).

Figure 7:
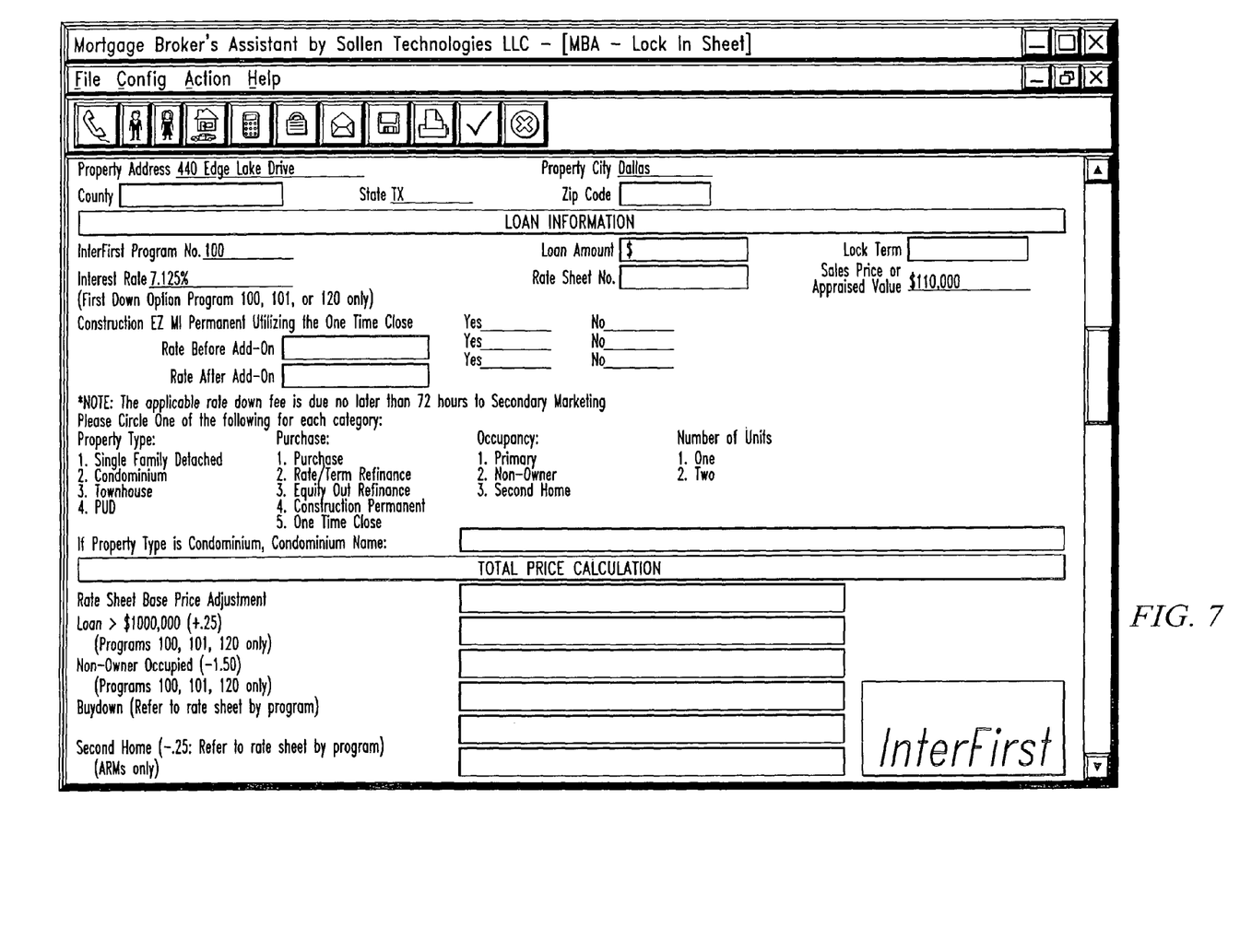
FIG. 7 is a screen display illustrating how a lender's online form is populated with information collected during the information exchange.

Among the documents produced, for example, are the registration and lock sheets. These are the purchase orders of this industry and vary widely from lender to lender. As noted above, the VGWL-engine is lender-aware and preferably produces an exact copy (either from a bitmap or an electronic form of the required document) of the lender's document. The fields in these documents are populated from the data already available on the screen or from the data repositories of existing loan processing software packages. This is illustrated in FIG. 7.

When used in this mode, the VGWL-engine acts like an electronic, smart form of the wholesale lender's rate sheet. Thus, in a preferred embodiment, the rates and YSPs shown are corrected (adjusted) values. In a representative implementation, the broker selects (clicks on) the rate-YSP pair and the system presents a lender lock sheet of the lender, already filled out.

For brokers that want to take the rate sheets to a remote location, a customized rate sheet summary may be generated as illustrated in FIG. 8. The main difference between this implementation and some existing services is that the rate sheets are configurable (the broker picks the loan programs represented) and the YSPs reflect the broker's discount arrangements with the individual lenders.

The invention allows the wholesale lender to improve the customer information flow dramatically. By allowing the rate information (e.g., a rate sheet) to flow through the VGWL-engine, the lender can get rates, YSPs, conditions, adjustments, promotions, and individual (broker) discounts to the point of use virtually in real-time. Using the present invention, the process of registering a loan and locking in the interest rate can be fully automated. Today, about 30% of all lock/registration forms have one or more problems requiring human intervention.

Figure 9:
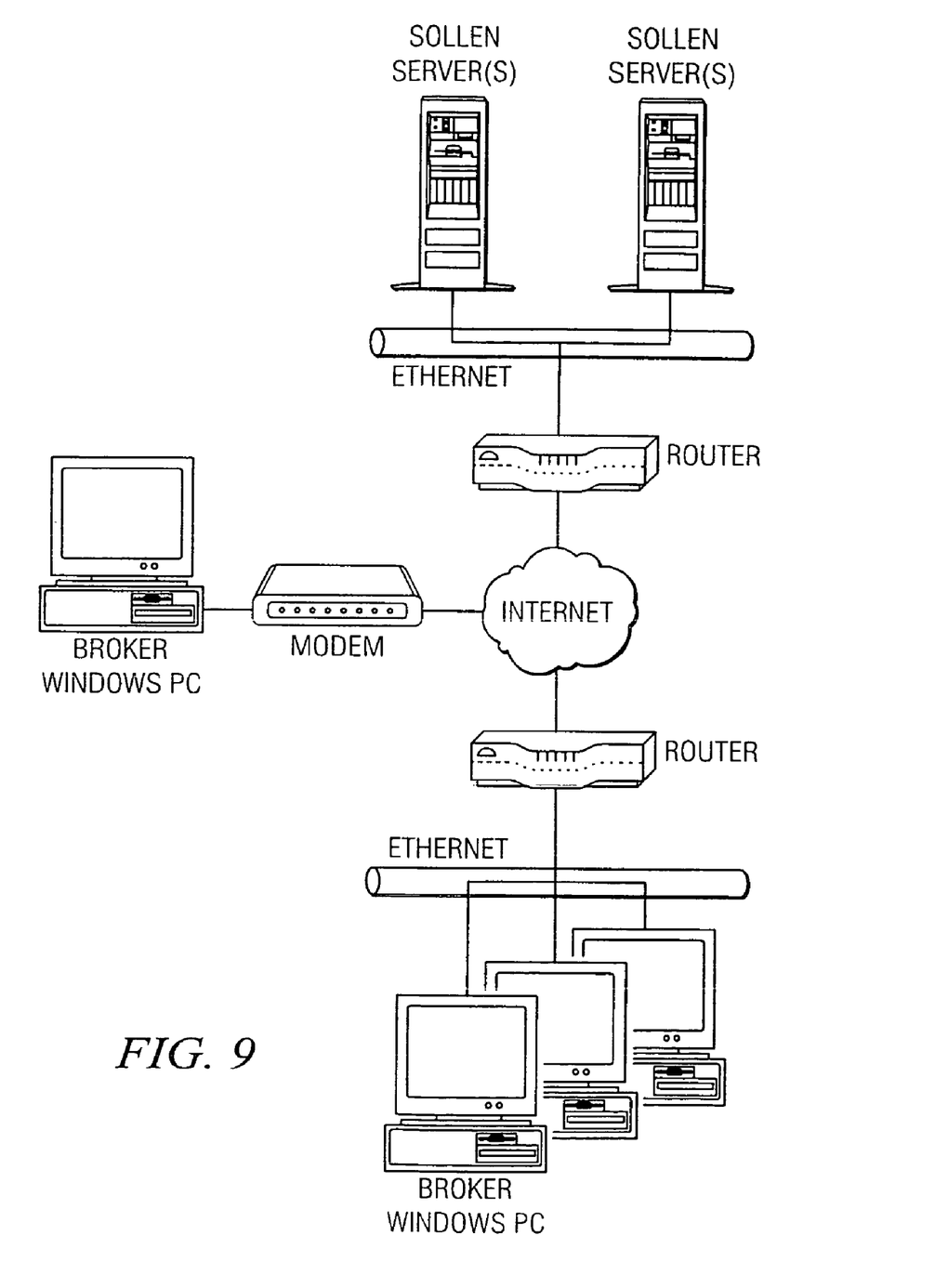
FIG. 9 illustrates a representative network implementation of the present invention.

As illustrated in FIG. 9, the servers of the mortgage information exchange platform are preferably the repository for the rate, YSP, loan program, insurance and advertising information from the wholesale lenders. The information is presented in a tailored form to the broker. Information from the broker to the lender is directed from the broker's PC to the lender's site, over the internet. In order to efficiently collect the rate sheets, a number of technologies may be used as illustrated in FIG. 10:

Unattended, trainable WEB browser to automate collection of down-loadable rates form the Wholesale Lenders web sites. This is done in several different formats Comma Separated Value files (CSV)

Microsoft Excel Spreadsheets (XLS)

PDF files

Automated FAX receiving, cataloging and OCR-ing (optical character recognition) transferring the rate sheets (as faxed to the brokers) to the Relational Database Backbone of the VGWL-engine. Rate sheets are segmented by the lender's programs and automatically classified, OCR-ed and then presented to a data entry person after (rules-based) rate-parsing.

The PDF files are processed like faxes because the PDF files can be in bitmap format. When the PDF files retrieved can be TEXT-converted, a pre-parser converts the PDF content into a CSV or XLS file.

The resulting CSV and XLS files go through an automated electronic Rate Processor to be entered into the central Relational Database.

The resulting system can transfer the wholesale lender's rates from their format into the Data Base 900 in a matter of seconds, making rates available for download to the brokers in virtual real time. The rate system allows for geographic classification down to the ZIP code level. When a broker requests the rates of a certain wholesale lender, then the lender has the option to have the system download a set of rates based on the broker's or the property's ZIP code. This can be done using ZIP-code dependent adjustments to existing rate sheets, or, if required, independent ZIP-code-based rate sheets.

The system allows for central (database) storage of the disqualifying, rate- or YSP-modifying, or insurance requirement-modifying conditions. These conditions are constantly monitored on the rate sheets for changes.

When downloaded to the individual brokers, these database tables, through a borrower-profile-controlled database-join scheme result in real-time interactive elimination of certain lenders, adjustments to rates, YSPs and insurance requirements based on borrower profile elements entered by the broker. The design of the database tables, combined with the dynamic join scheme, make this functionality transparent to the broker.

To provide optimal flexibility, in addition to the geographicrate segmentation, the mortgage information exchange system allows for individualized rate sheets by brokers, including but not limited to conditional adjustments downloaded to the broker's PC. This enables the system to provide adjustments such as extra discounts based on location and/or other borrower profile elements, combined with broker performance criteria such as loan volume, to become possible.

Thus, in an illustrative embodiment, the system may include both a broker-based repository with interface and a centralized web-based repository. The information generated by the broker's actions (mouse-clicks, program consultations, program selections, rate and YSP choices, etc.) can be collected and temporarily stored at the broker's site. When the broker connects to get his or her rates, this information can be transmitted to the central site. This information can also be analyzed to produce extremely effective and precise marketing information. The information generated this way is exceptionally context rich since it was collected at the point of sale and with all of the borrower's profile available.

As noted above, the inventive mechanism is preferably implemented in server-side code.

Generalizing, the above-described functionality is implemented in software executable in a processor, namely, as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, as used herein, a "client" should be broadly construed to mean any computer or component thereof directly or indirectly connected or connectable in any known or later-developed manner to a computer network, such as the Internet. The term "server" should also be broadly construed to mean a computer, computer platform, an adjunct to a computer or platform, or any component thereof. Of course, a "client" should also be broadly construed to mean one who requests or gets the file, and "server" may also be the entity which downloads the file, depending upon the context.

Having thus described preferred embodiments of our invention, what we claim as new and desire to secure by Letters Patent is set forth in the following claims.

What is claimed is:

1. A method operative on a web server to facilitate a web-based information exchange between a broker and a set of wholesale lenders, comprising:

exposing, on a display device of a computer platform at a broker location, to the broker at least one generic mortgage lender profile over said web-based information exchange, the at least one generic mortgage lender profile simultaneously exposing generic mortgage profile information for a plurality of different specific wholesale lenders;

applying a given generic mortgage lender profile, said generic mortgage lender profile being stored as computer readable code on a server connected to said computer platform over a network connection, to given data to identify a set of one or more specific wholesale lenders who meet criteria specified in the given data, responsive to entry by the broker of the given data; and exposing, on said display device of said computer platform at a broker location, to the broker a specific mortgage lender profile instantiated with a set of unique lender characteristics for use by the broker in completing a mortgage transaction over said web-based information exchange, responsive to selection by the broker of one of the specific wholesale lenders.

2. The method as described in claim 1 wherein the set of unique lender characteristics includes a rate sheet.

3. The method as described in claim 1 wherein the set of unique lender characteristics includes an eligibility matrix.

4. The method as described in claim 1 wherein the set of unique lender characteristics includes a lock sheet.

5. The method as described in claim 1 further including the step of displaying to the broker mortgage rates and prices.

6. The method as described in claim 1 further including the step of having the broker lock a loan online.

* * * * *